(12) United States Patent
Michel et al.

(10) Patent No.: US 10,687,125 B2
(45) Date of Patent: Jun. 16, 2020

(54) HEAT AND TEMPERATURE MONITORING DEVICE

(71) Applicant: Danielle Marie Michel, St. James, NY (US)

(72) Inventors: Danielle Marie Michel, St. James, NY (US); Timothy Ken-Wing Woo, Atlanta, GA (US)

(73) Assignee: Danielle Marie Michel, St. James, NY (US)

( * ) Notice: Subject to any disclaimer, the term of this patent is extended or adjusted under 35 U.S.C. 154(b) by 33 days.

(21) Appl. No.: 15/881,470

(22) Filed: Jan. 26, 2018

(65) Prior Publication Data

US 2018/0220207 A1 Aug. 2, 2018

Related U.S. Application Data

(60) Provisional application No. 62/451,461, filed on Jan. 27, 2017.

(51) Int. Cl.
| | |
|---|---|
| *H04Q 9/00* | (2006.01) |
| *G01K 1/14* | (2006.01) |
| *G01K 1/02* | (2006.01) |
| *G08B 25/10* | (2006.01) |
| *G08B 25/00* | (2006.01) |
| *G08B 21/18* | (2006.01) |
| *G08B 5/36* | (2006.01) |

(52) U.S. Cl.
CPC ............... *H04Q 9/00* (2013.01); *G01K 1/024* (2013.01); *G01K 1/14* (2013.01); *G08B 5/36* (2013.01); *G08B 21/182* (2013.01); *G08B 25/10* (2013.01); *G08B 25/005* (2013.01); *H04Q 2209/43* (2013.01); *H04Q 2209/823* (2013.01)

(58) Field of Classification Search
CPC ....................................................... H04Q 9/00
USPC ..................................................... 340/870.17
See application file for complete search history.

(56) References Cited

U.S. PATENT DOCUMENTS

| | | | | |
|---|---|---|---|---|
| 4,904,997 A * | 2/1990 | Chen | ...................... | G01K 1/024 340/870.17 |
| 5,482,373 A * | 1/1996 | Hutchinson | ............ | G01K 11/12 374/141 |
| 5,897,207 A * | 4/1999 | Hartmann | ............. | F25D 29/008 116/216 |
| 6,351,217 B1 * | 2/2002 | Kuhn | ................... | G01K 13/002 340/573.1 |
| 8,620,841 B1 * | 12/2013 | Filson | ................. | H04L 12/1895 706/12 |

(Continued)

*Primary Examiner* — Albert K Wong
(74) *Attorney, Agent, or Firm* — Collard & Roe, P.C.

(57) ABSTRACT

At least one embodiment of the invention relates to a temperature and heat monitoring device comprising a housing, at least one microcontroller disposed in the housing, at least one sensor configured to determine an amount of heat adjacent to the device, at least one memory configured to store a predetermined set of values relating to heat and at least one power source in communication with the microcontroller. There is also at least one transmitter configured to communicate with an adjacent electronic device, wherein said at least one microcontroller is configured to read signals from said at least one sensor, and to determine whether the information from said sensor is outside of said predetermined set of values relating to heat and then to selectively send a signal to the adjacent electronic device to indicate a heat or temperature condition.

23 Claims, 23 Drawing Sheets

(56) References Cited

U.S. PATENT DOCUMENTS

| | | | |
|---|---|---|---|
| 2003/0212340 A1* | 11/2003 | Lussier | G01K 13/002 600/549 |
| 2004/0111186 A1* | 6/2004 | Rossi | G05B 23/0235 700/276 |
| 2004/0173476 A1* | 9/2004 | LeTourneau | G01K 1/083 206/306 |
| 2007/0160112 A1* | 7/2007 | Nanda | G01K 1/028 374/163 |
| 2010/0109895 A1* | 5/2010 | Rosener | H04M 1/05 340/686.1 |
| 2010/0128753 A1* | 5/2010 | Claypool | G01K 1/02 374/102 |
| 2013/0054150 A1* | 2/2013 | Sacks | A61B 10/0012 702/19 |
| 2013/0127634 A1* | 5/2013 | Grumbles, III | G08C 19/00 340/870.02 |
| 2013/0220143 A1* | 8/2013 | Fetterman | A47J 36/2405 99/330 |
| 2014/0266791 A1* | 9/2014 | Lloyd | H04Q 9/00 340/870.09 |
| 2015/0091739 A1* | 4/2015 | Ridley | H04Q 9/00 340/870.03 |
| 2015/0319553 A1* | 11/2015 | Grumbles, III | H04W 4/38 702/188 |
| 2015/0382085 A1* | 12/2015 | Lawrie-Fussey | G06K 19/0717 340/870.07 |
| 2016/0153674 A1* | 6/2016 | Lancaster | H04Q 9/00 700/276 |
| 2017/0156594 A1* | 6/2017 | Stivoric | A61B 5/7275 |
| 2017/0186309 A1* | 6/2017 | Sager | H04Q 9/00 |
| 2017/0220985 A1* | 8/2017 | White | G06Q 10/08 |
| 2018/0014093 A1* | 1/2018 | Hyde | H04Q 9/00 |
| 2018/0114430 A1* | 4/2018 | Westmacott | G08B 29/183 |
| 2018/0115737 A1* | 4/2018 | Matsuda | H01L 31/053 |
| 2018/0143081 A1* | 5/2018 | Van Endert | G05B 15/02 |
| 2018/0299192 A1* | 10/2018 | Clark | F25D 31/005 |
| 2019/0101516 A1* | 4/2019 | Afzal | G01R 33/06 |

* cited by examiner

Fiducials & Markings

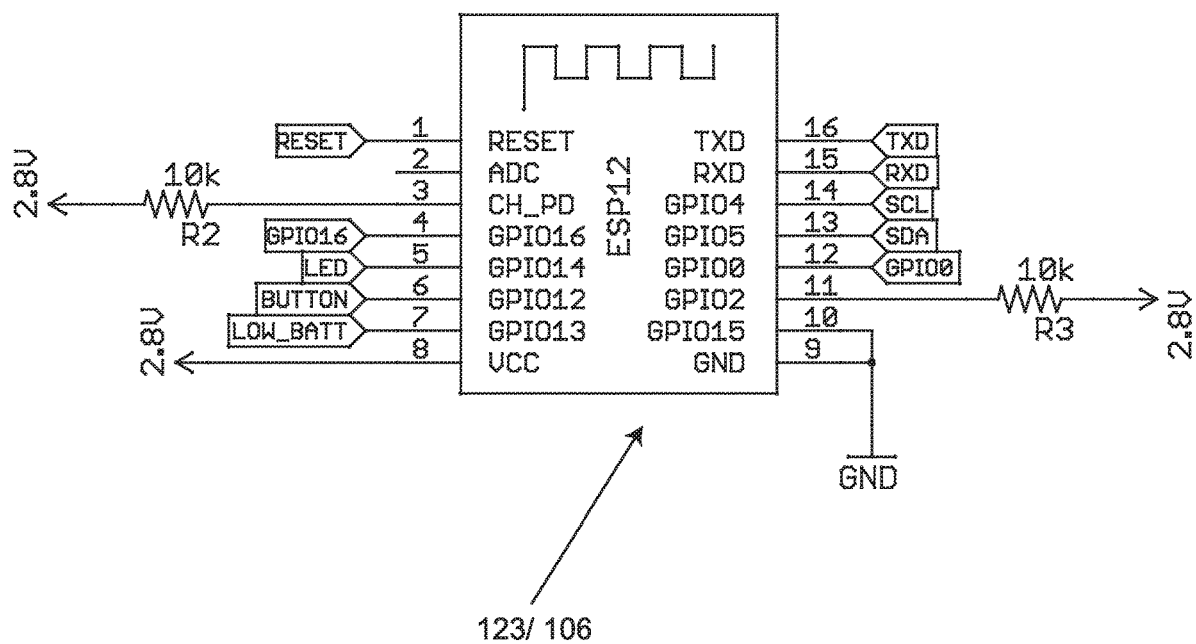

I2C Temperature Sensor

HEAT AND TEMPERATURE MONITORING DEVICE

CROSS REFERENCE TO RELATED APPLICATIONS

This application is a non-provisional application that hereby claims priority from provisional application Ser. No. 62/451,461 filed on Jan. 27, 2017, the disclosure of which is hereby incorporated herein by reference in its entirety.

BACKGROUND

At least one embodiment of the invention relates to a device that is designed to monitor temperature on any item by providing reminders and warnings, which prevents overheating and promotes fire safety. The product comprises a temperature monitor that can attach to any item of concern. Each item will be identifiable and will be programmed to detect when an item is in use by temperature tracking. When the temperature deviates from what is considered its normal state or "room temperature" the product is to be considered in use or an "on" button will be utilized. After a certain amount of time in use and left on, the app will send reminders to a paired phone which will allow the option for dismissal of the reminders. Danger zones and safety levels will be created specific to each item. For example, if a user does not select an item in the app to identify, the app will still monitor and notify user of usage but will not have the specific criteria linked.

For example, if the product is assembled on a Christmas tree to monitor temperature in case of a fire which is a top cause of residential home fires, the Christmas tree should always be at room temperature ideally with slight variation. If the tree was to go on fire and reach fire burning temperatures and you do not identify that the item being monitored is a Christmas tree, the app will notify you that the item is in use and will not notify the user that the object is in the danger zone. If the item being tracked is identified as a tree and fire burning temperatures are reached, a Christmas tree is immediately considered danger zone since there is no off and on temperature as there would be for a stove or curling iron. When an item has been on for an extensive amount of time, has reached the temperature max capacity, and is in a moderate to dangerous zone, the app will send an alert notification to designated party through a paired app. The alert will notify linked emergency contacts provided if no action is taken by the main user. If no action or change is noted, lastly the closest fire department will be contacted. The closest fire department will be paired by the GPS or selection in the initial app download as part of the required information. The apparatus can be linked to a smart phone/computer/iPad by downloading an app. The device can then be connected to the app by simply naming each item. Once the device is linked to the app, the user will be able to monitor each item with the click of a button from any location. The device can be used on any item that is temperature sensitive. Some examples, but are not limited to are candles, trees, hair straightener, curling iron, stove, light fixtures such as lamps, fireplaces, irons, steamers, electric heaters, coffee pots, tea kettles, BBQs and more.

SUMMARY

At least one embodiment of the invention relates to a temperature and heat monitoring device comprising a housing, at least one microcontroller disposed in the housing, at least one sensor configured to determine an amount of heat adjacent to the device, at least one memory configured to store a pre-determined set of values relating to heat and at least one power source in communication with the microcontroller. There is also at least one transmitter configured to communicate with an adjacent electronic device, wherein said at least one microcontroller is configured to read signals from said at least one sensor, and to determine whether the information from said sensor is outside of said predetermined set of values relating to heat and then to selectively send a signal to the adjacent electronic device to indicate a heat or temperature condition.

In at least one embodiment, the device further comprises at least one fastener coupled to the housing. Thus, in any one of the embodiments the fastener can include a clip, a hook and loop fastener, a screw, a rivet, shaft or any other suitable fastener.

In at least one embodiment, the transmitter can include any one of a Bluetooth transmitter, a WIFI transmitter, a cellular transmitter or any other suitable transmitter. For near field or adjacent communications, the transmitter can contain a Bluetooth transmitter, for communications beyond a near field, the transmitter can transmit via WIFI or cellular communications or any other type of communications. In at least one embodiment, there is at least one LED indicator which is coupled to the housing and which is configured to change colors depending upon instruction from the microcontroller.

In at least one embodiment, there is at least one power source which comprises at least one battery. In at least one embodiment there is least one power source which comprises at least one USB port.

In at least one embodiment, there is at least one reset button.

In at least one embodiment, there is at least one programming interface in communication with the at least one memory, wherein the programming interface is configured to input information into said at least one memory a motion sensor and at least one audible indicator such as a buzzer.

For purposes of the different embodiments, the term microcontroller can encompass a microprocessor having an on board memory as well as other components such as an on board transmitter.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views:

FIG. 6E is a view of the microcontroller and WIFI of FIG. 6;

DETAILED DESCRIPTION OF PREFERRED EMBODIMENTS

Figure 1:
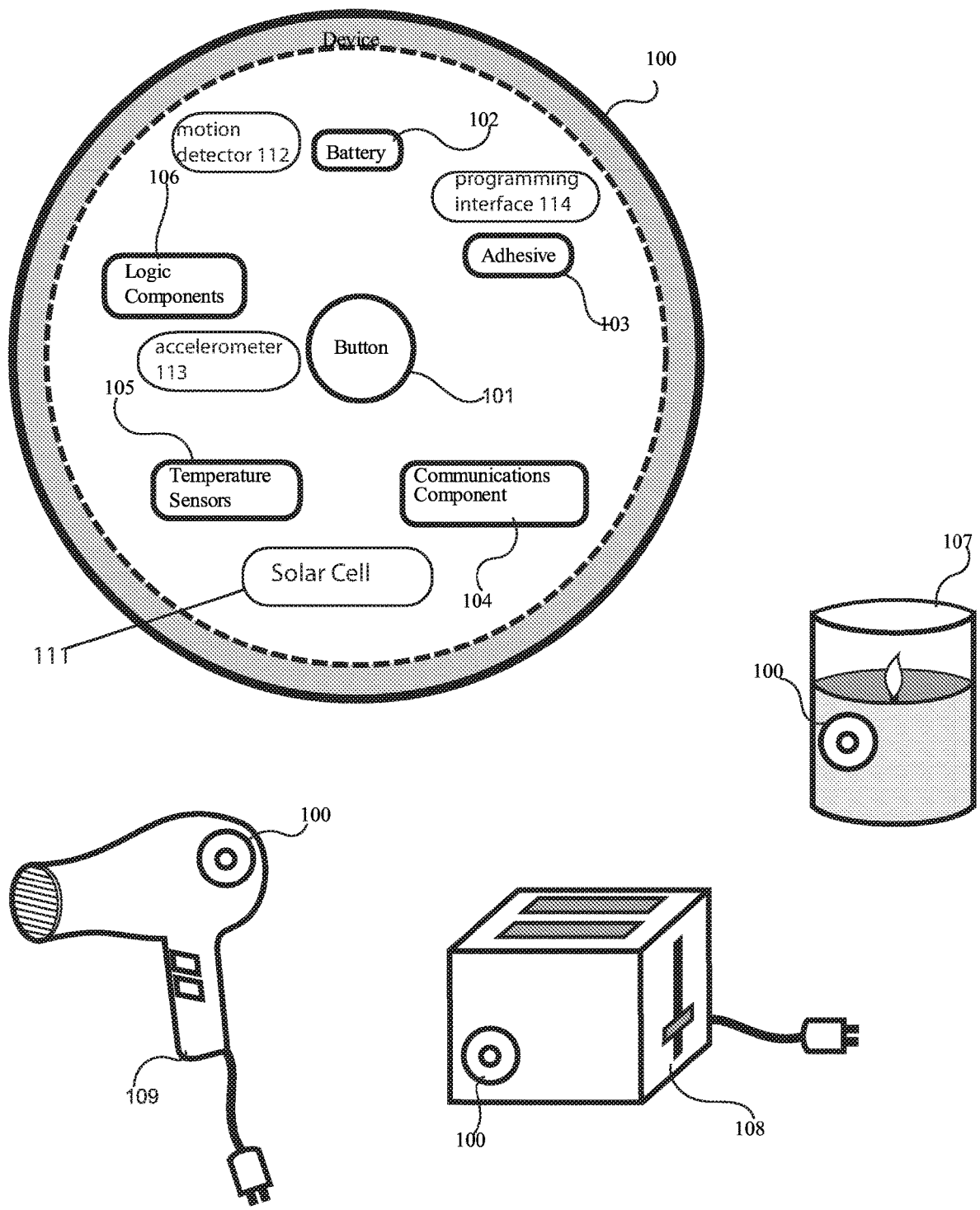
FIG. 1 is a schematic diagram of the apparatus and its components including examples of items to be tracked.

FIG. 1. Is a schematic diagram which displays the device 100 and its components. The device 100 is a temperature sensor which is made durable to attach to appliances and other items of preference.

Figure 6:
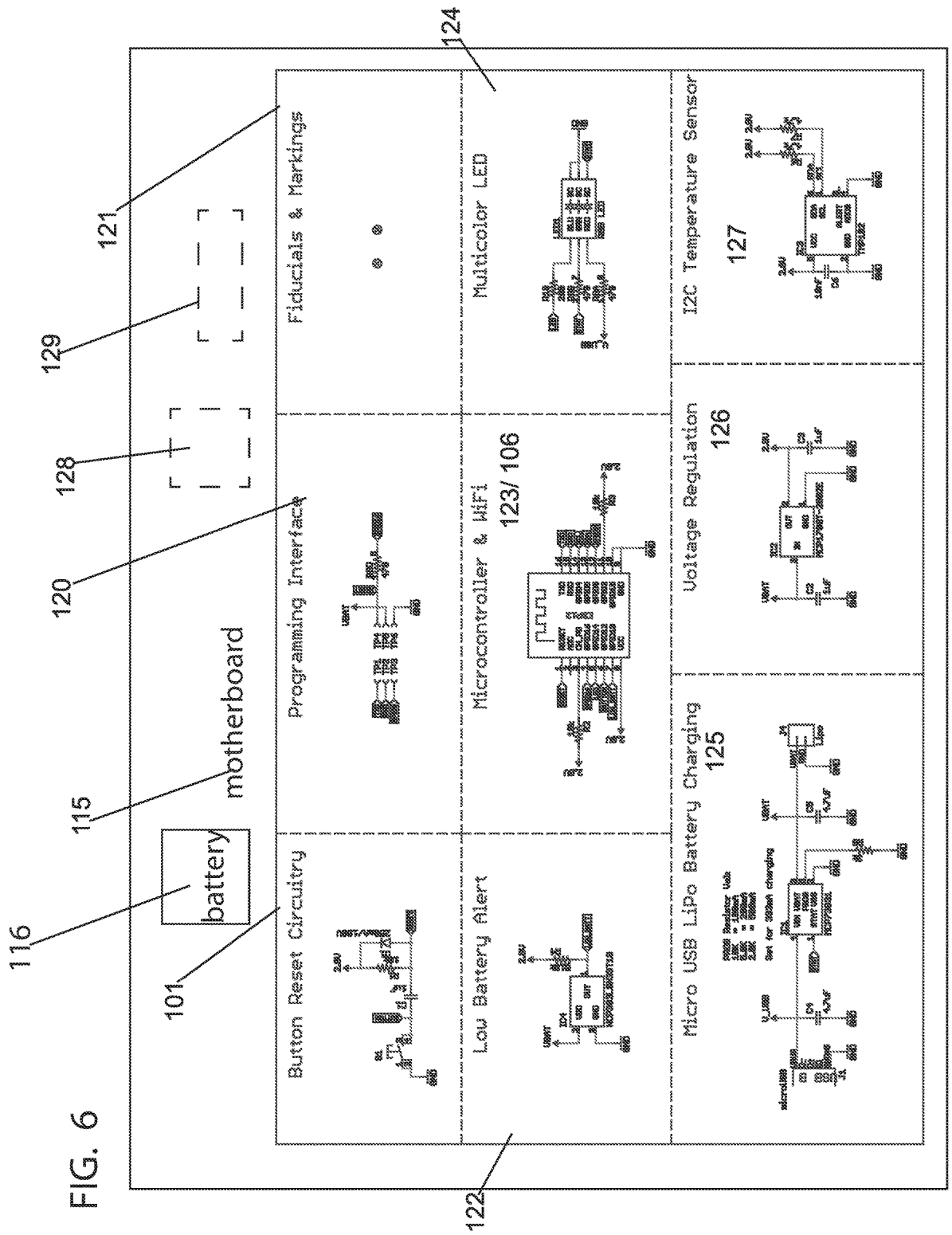
FIG. 6 is a view of the circuitry of the device.
Figure 6A:
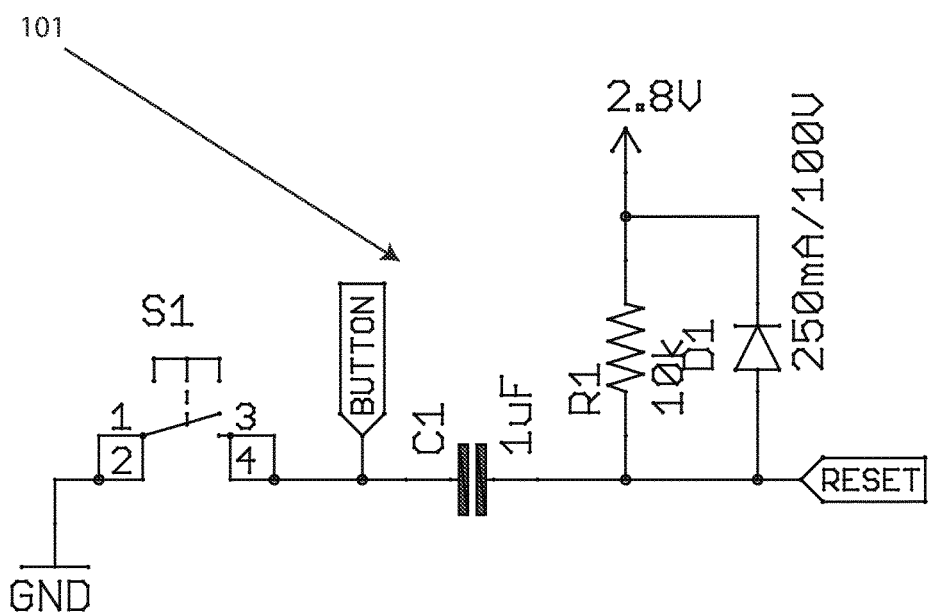
FIG. 6A is a view of the button reset circuitry shown in FIG. 6.
Figure 6B:
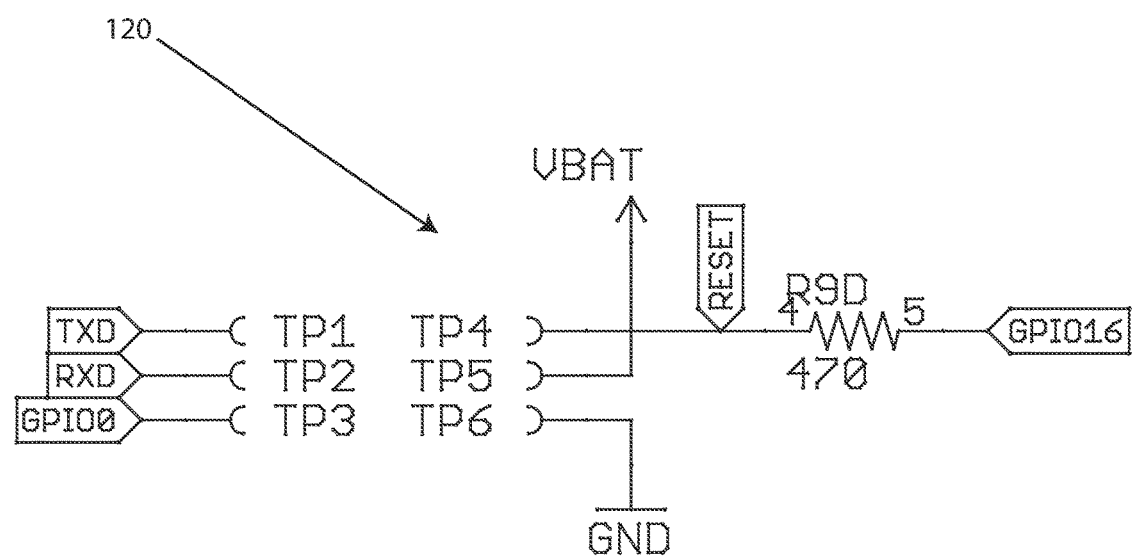
FIG. 6B is a view of the programming interface shown in FIG. 6.
Figure 6C:
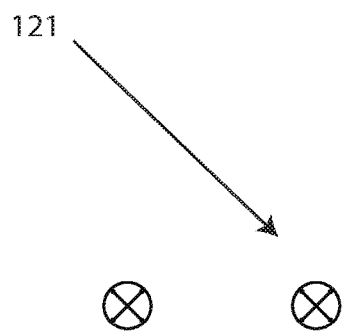
FIG. 6C is a view of the Fiducials and Markings shown in FIG. 6.
Figure 6D:
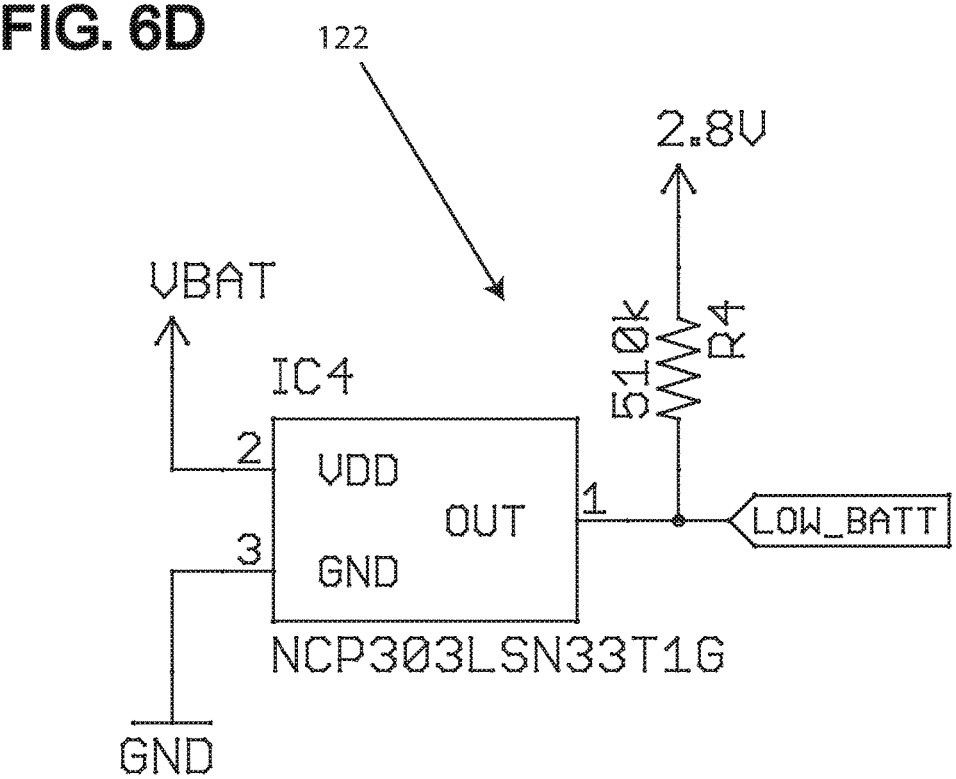
FIG. 6D is a view of the low battery alert shown in FIG. 6.
Figure 6F:
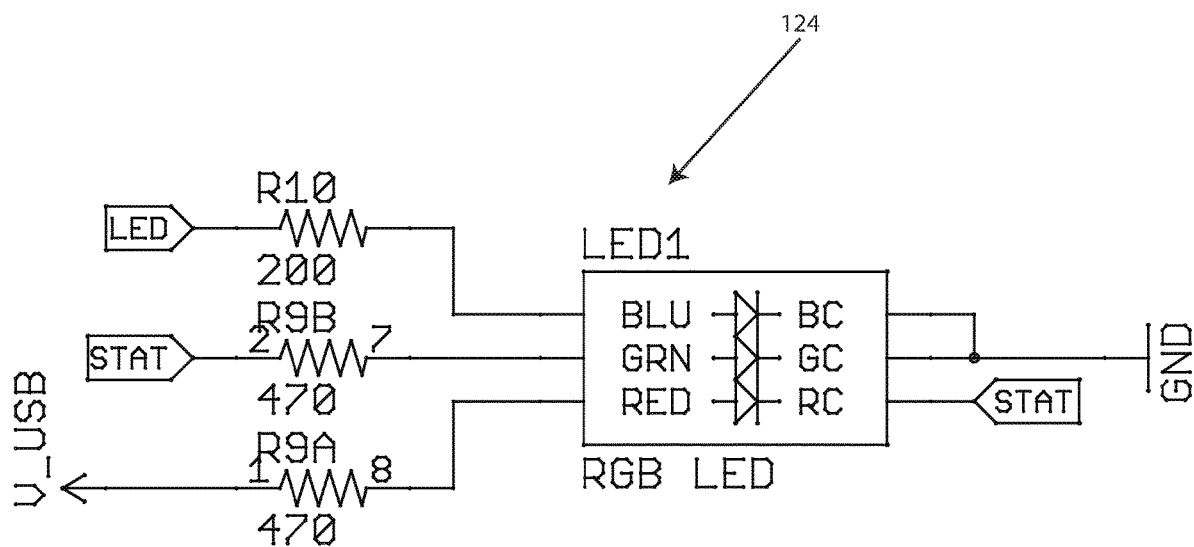
FIG. 6F is a view of the multicolor LED of FIG. 6.
Figure 6G:
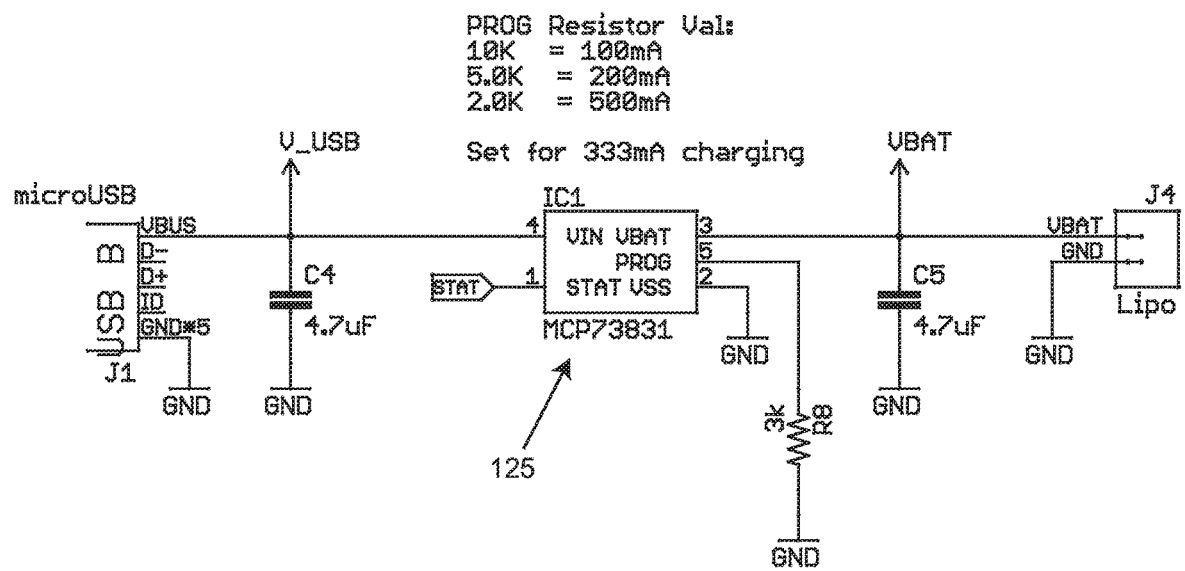
FIG. 6G is a view of the micro USB of FIG. 6.
Figure 6H:
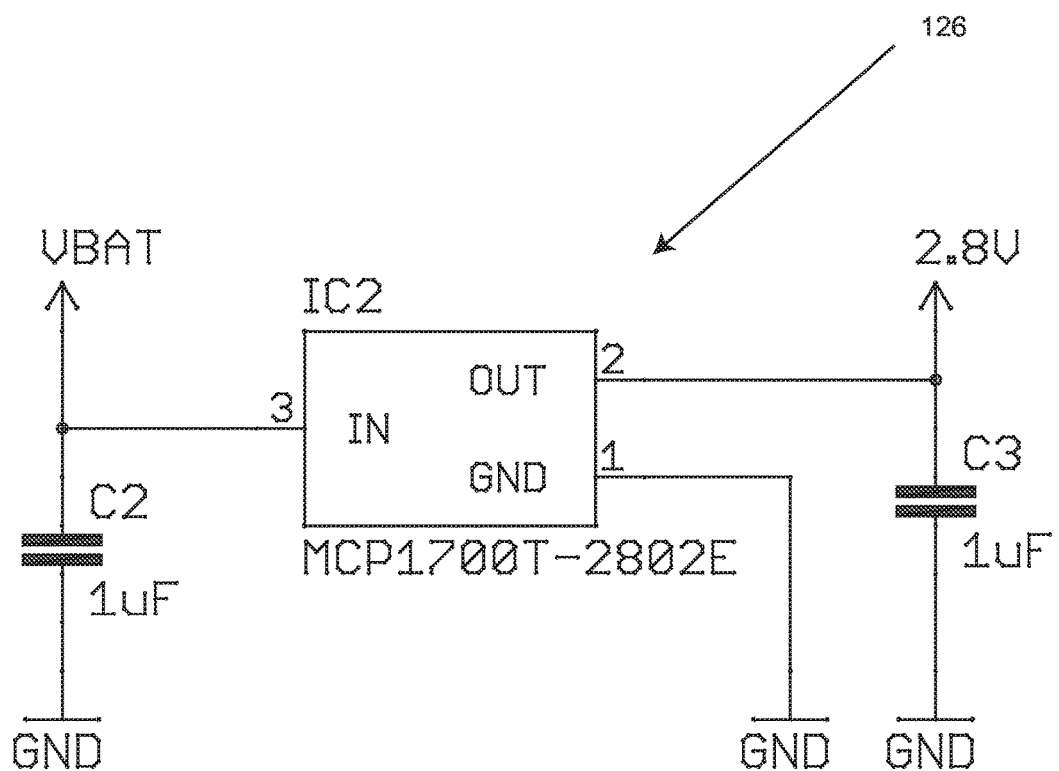
FIG. 6H is a view of the voltage regulation of FIG. 6.
Figure 6I:
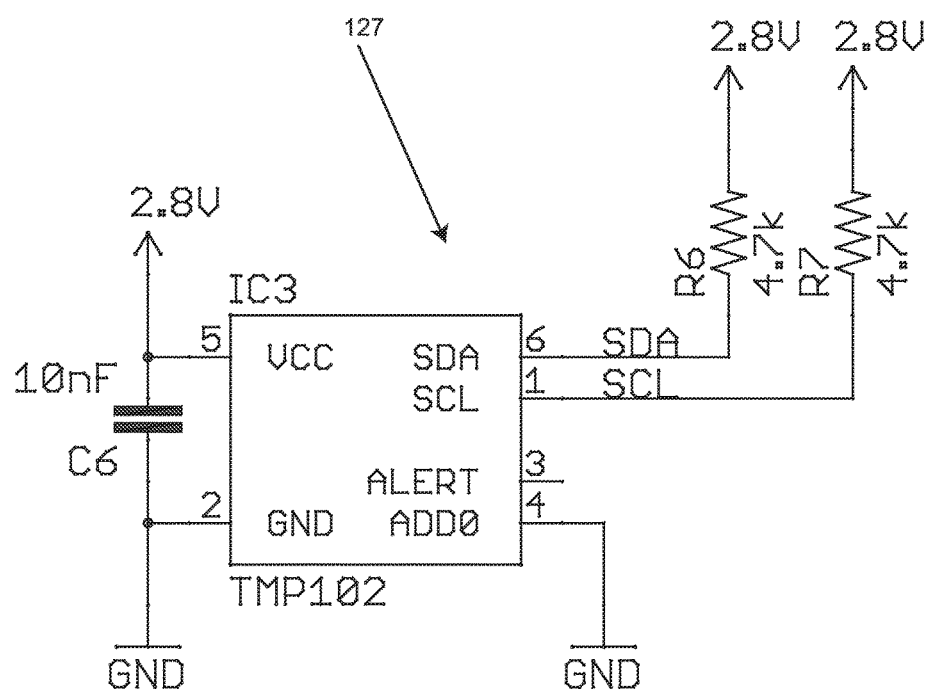
FIG. 6I is a view of the I2C Temperature Sensor of FIG. 6.

The apparatus is inclusive of at least one of the following: a button 101, a battery 102, at least one fastener such as an adhesive 103, communication component 104, temperature sensors 105, and logic components 106. The logic component may comprise at least one microcontroller. The device can also include a solar cell 111 which when employed can be used to recharge the battery 102. Furthermore, the device can also optionally include a motion detector 112 or an accelerometer 113. This device can also include a programming interface which is configured to allow for both programming and charging such as a USB interface as also shown in FIG. 6. All of these electronic components are coupled together via a motherboard which is configured to allow for both communication and power to be extended between each of these components. For purposes of the different embodiments, the term microcontroller can encompass a microprocessor having an on board memory as well as other components such as an on board transmitter.

It is understood that each one of these components can be made of any number of devices. It is also understood that there may be additional devices not listed in this diagram which comprise the final product. In addition, although each component is shown separate it is possible that two or more components may be combined into one. For example, the communication component 104 and the logic components 106, may be combined or any other combination of components is possible.

Each device 100 has an identifiable characteristic that is configured to track events such as but not limited to heat or temperature related events. Events that occur are the apparatus/sensor is in use, zone notifications, emergency contact notifications, and more. Events can also be alerts and notifications with communication devices. Overall event examples are when an item is in use which will be determined by deviation of temperature from normal state which shows item is in use (without use of on/off buttons), or by activating the apparatus with an "on" button.

Figure 2A:
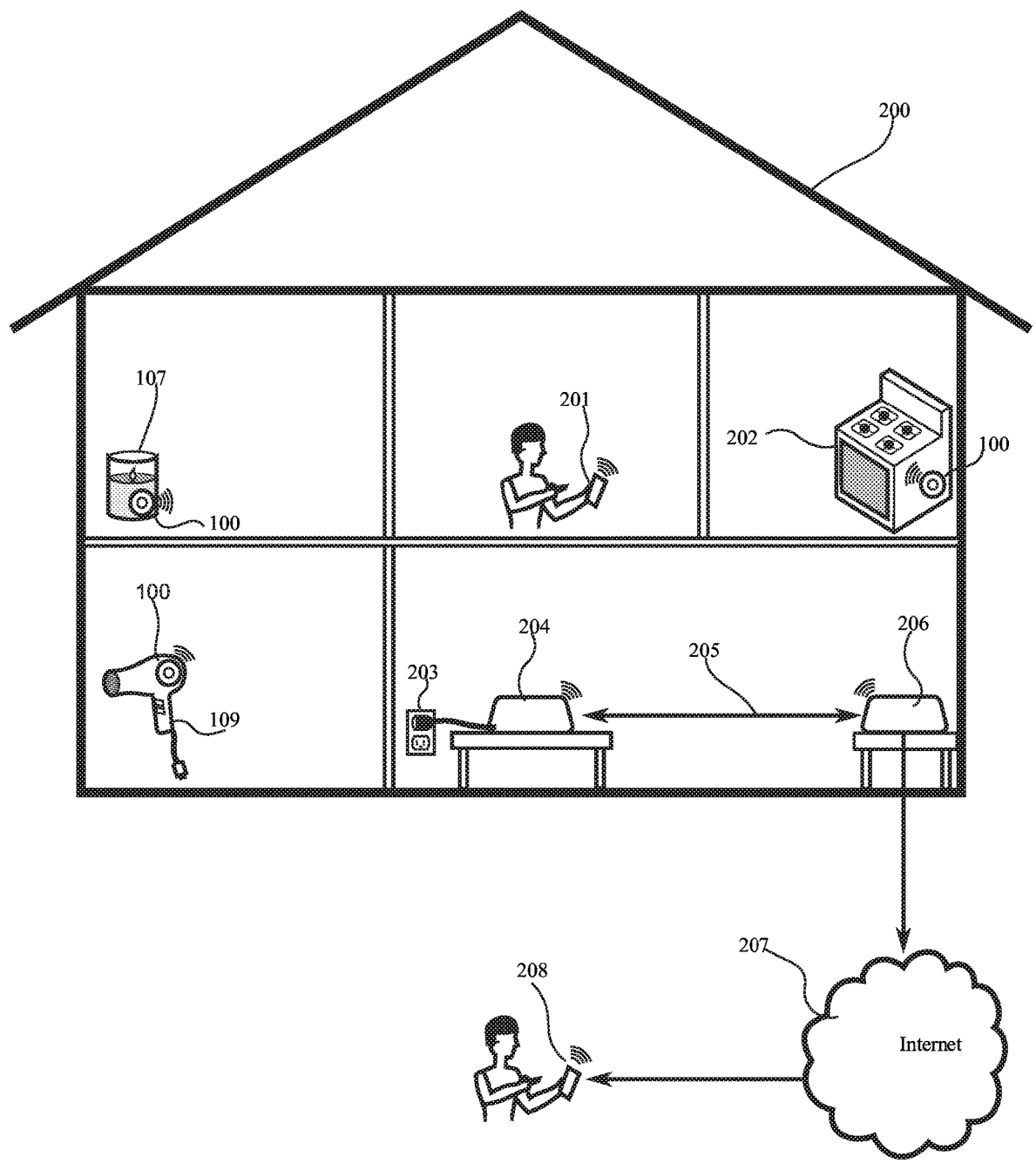
FIG. 2A is a schematic diagram of the apparatus and its communication options with WIFI and Bluetooth with and without a base station.

FIG. 2A shows the device 100 in use in a house 200. For example, the device can be positioned on or fastened to a candle 107. A user in another room operating a cellular telephone or mobile communication device such as device 201 can monitor the condition of the lit candle via the device 100. This user operating the mobile device 201 can also monitor the condition of a hair dryer 109, as well.

The device 100 can communicate directly with smart devices such as cell phones such as cell phone or mobile device 201, or through a blue tooth or WIFI module. There is the option of the apparatus communicated with a base station 204, which would then be in communication with a computer network such as the internet. The option for the device 100 to communicate directly with the internet through either cellular communication or through a router such as router 206 is also possible.

Figure 2B:
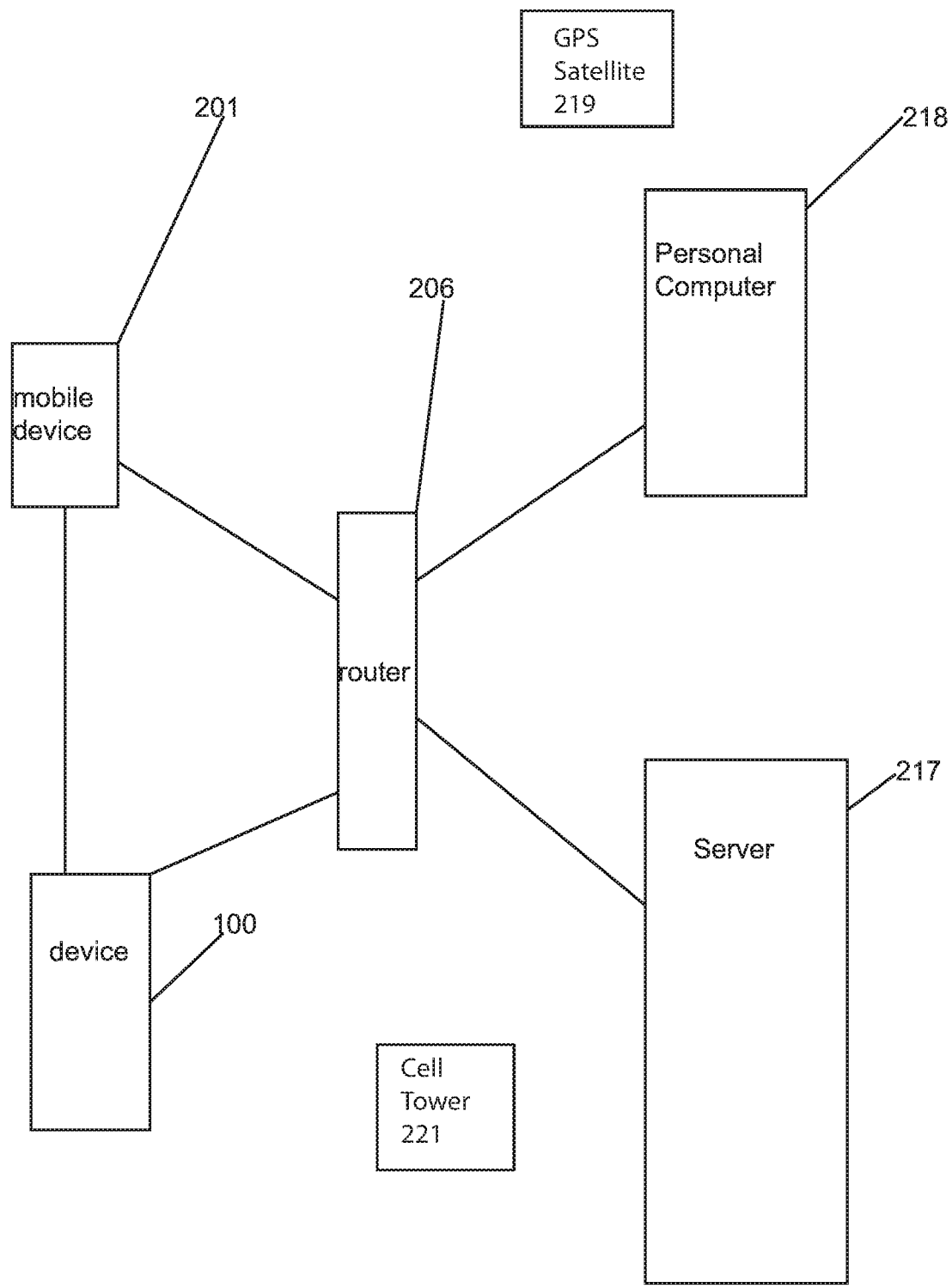
FIG. 2B is a schematic block diagram of a network of electronic devices for use with the device relating to the invention.

FIG. 2B shows another network layout which includes the device 100 which is configured to be in communication with any one of a device such as mobile device 201 or with a router 206 via WIFI communication. The device can directly communicate with a mobile device 201 via either Bluetooth, point to point, WIFI, or cellular communications. In addition, the device 100 can communicate with a router via any known wireless protocols such as Bluetooth, WIFI, or cellular communications. Router 206 is configured to be in communication with other devices such as another personal computer 218 such as on a local network. Alternatively, or in addition, router 206 can be in communication through the internet with other devices such as server 217. For purposes of determining geofencing or determining the distance a user is away from a device different wireless components can be used, including but not limited to, the router 206 having WIFI capabilities, a base station 204 (See FIG. 2A) a cell tower 221, and/or a GPS satellite 219. Each of these components can be used to track the location of a user using known triangulation calculations or communications to and from the user's mobile device.

Figure 3:
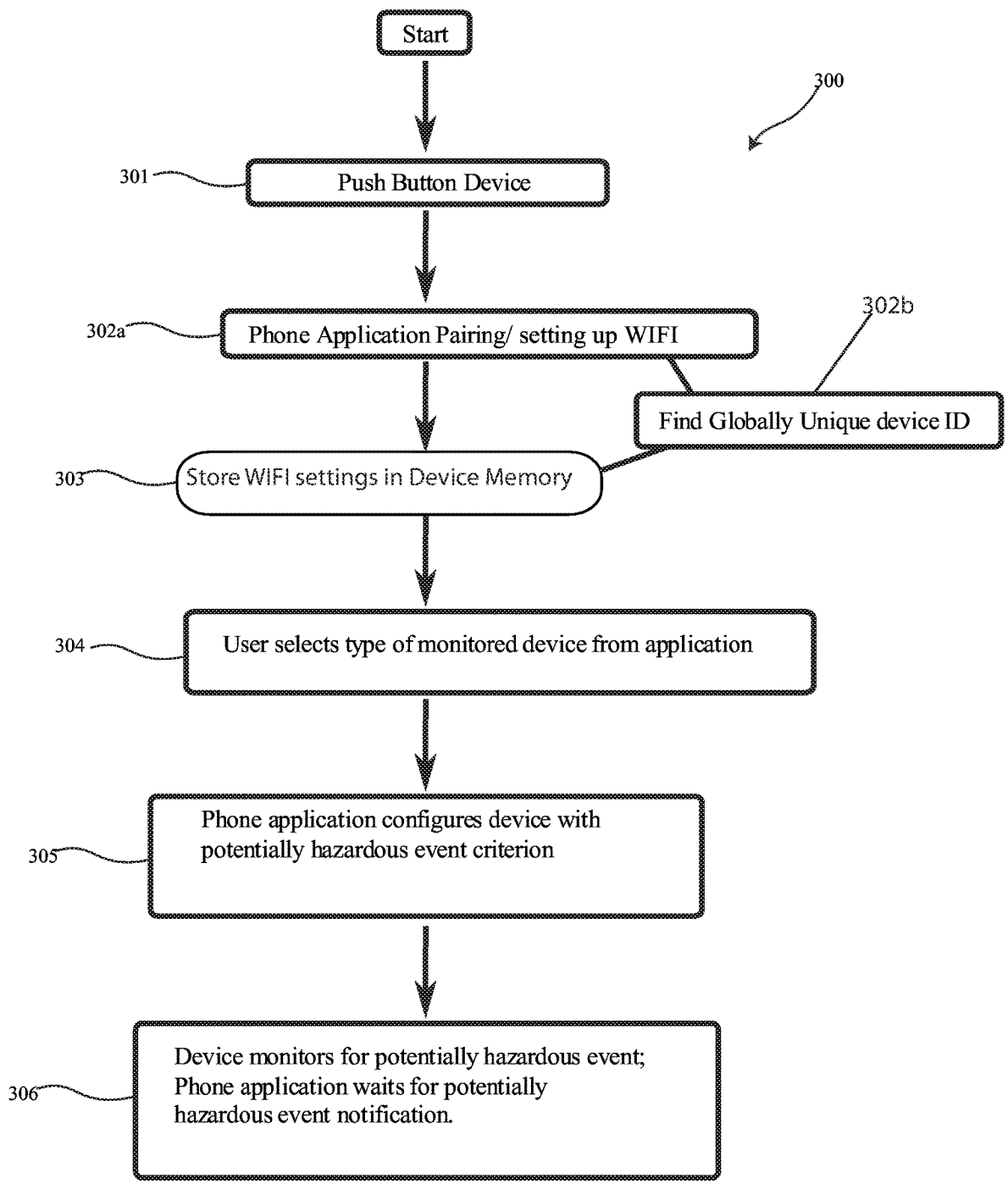
FIG. 3 is a flow diagram which portrays the correspondence with the apparatus and idea shown in FIGS. 1 and 2.

FIG. 3 shows a flow chart for initiating the device wherein the process starts and in step 301 the user pushes the push button 101 to initiate the device. Next, in step 302, the device pairs with a mobile device such as mobile device 201. Next, in step 303, the device finds a globally unique device ID. Next, in step 304, the user selects the type of device to be monitored from the application. This selection allows for differing types of predetermined settings to be used. For example, a first set of predetermined settings can be used for a candle, while another set of predetermined settings can be used for a stove or oven, while another set of predetermined settings can be used for a hair dryer while another set of predetermined settings can be used for a grill etc.

Next, in step 305, the mobile device 201 can be used to customize these recommended settings. For example, the user can select the differing criteria such as base temperature, duration of the temperature, the rate of temperature or heat rise on the device, the rate of heat or temperature falling in the device.

Next, in step 306 the device 100 is set to monitor for potentially hazardous events, for example, the mobile device 201 can be set for indication of the criteria to enter a pre-defined range of concern thereby signaling a potentially hazardous event.

Figure 4:
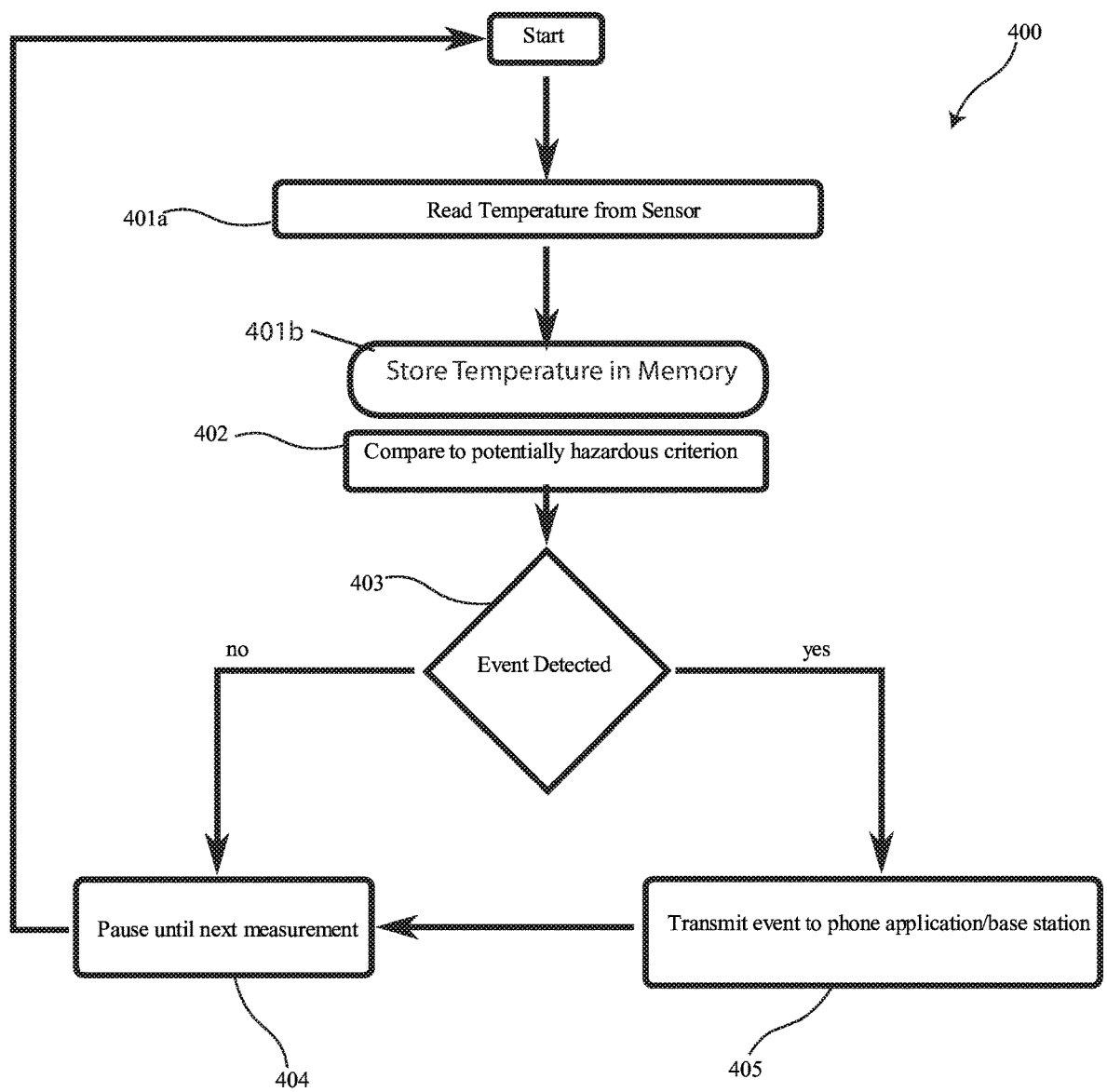
FIG. 4 is a flow diagram which portrays the correspondence with the apparatus and idea shown in FIGS. 1 and 2.

FIG. 4 shows the flow chart 400 for the device 100 reading the state of a detected object. For example, the process starts wherein in step 401, the temperature is read from the sensor such as sensor 127 (See FIG. 6), wherein the temperature is compared to potentially hazardous criterion in step 402. This settings for this potentially hazardous event are stored in memory such as in memory chip embedded with microcontroller 123, or in a separate memory element 128 in communication with microcontroller 123. (See FIG. 6). In step 403, the event is detected. This detection can be from detecting using a sensor such as sensor 127 (See FIG. 6). Once the event is detected it can be transmitted in step 405 via either an onboard WIFI or transceiver on microcontroller 123, or via a separate transceiver 129. Transceiver 129 can be any one of a WIFI, Bluetooth, or cellular based (CDMA, or SIM Card) transceiver. If event is not detected it will pause until next measurement 404. Alternatively, if the event is detected in step 405 the information is transmitted to a phone or mobile device such as device 201 or a base station such as base station 204. For purposes of the different embodiments, the term microcontroller 123 can encompass a microprocessor having an optional on board memory as well as other components such as an on board transmitter.

Figure 5A:
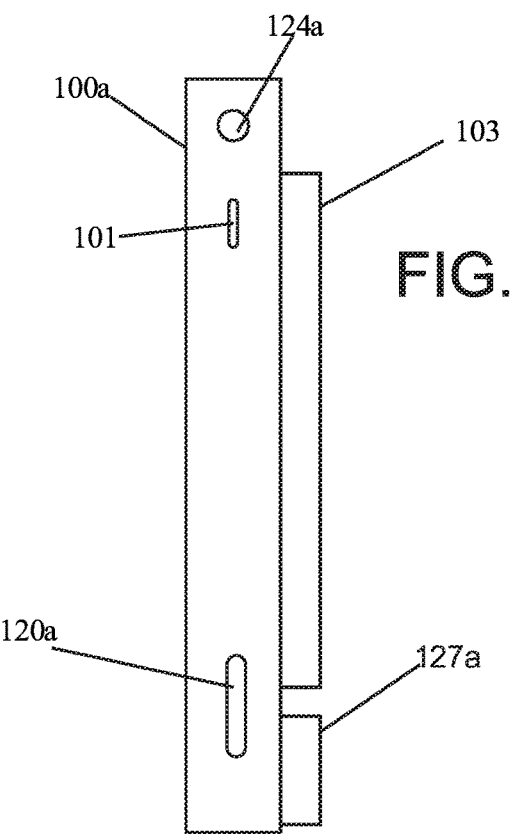
FIG. 5A Is a first side view of a first embodiment having a first type of fastener.

FIG. 5A is a view of another embodiment which discloses a first embodiment which includes a housing 100a, which is configured to house a motherboard such as motherboard 115 (See FIG. 6) which includes additional electronic components. In addition, coupled to housing 100a is at least one fastener. For example, in FIG. 5A there is an adhesive 103 coupled to a side of housing 100a. Adhesive 103 can be any form of any suitable adhesive, or it can be in the form of a hook and loop fastener as well.

In addition, there is at least one button 101, and at least one indicator light 124a which is associated with multicolor LED 124 of FIG. 6. Furthermore, there is a port 120a which includes a programming interface and/or a micro-USB charging port for charging the device. Attached to the housing is also a sensor plate 127a which is associated with a heat or temperature sensor 127 shown in FIG. 6 which reads the temperature or heat associated with an adjacent device.

Figure 5B:
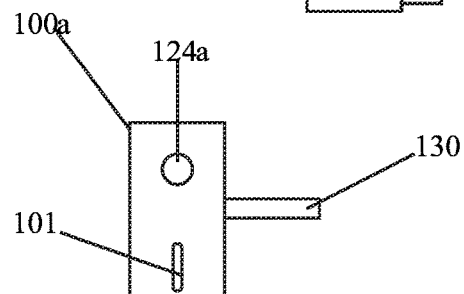
FIG. 5B is a second side view of the first embodiment having a second type fastener.

FIG. 5B is another view of another embodiment wherein there is a fastener such as fastener 130 which may be in the form of a post, a nail, a screw, a rivet or any other type of suitable fastener.

Figure 5C:
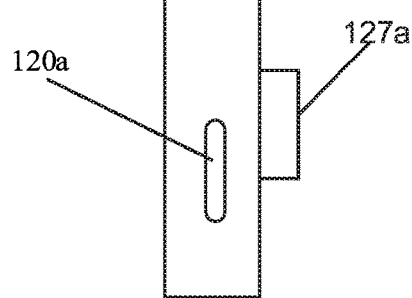
FIG. 5C is a side view of a first embodiment having a third type fastener.

FIG. 5C is a side view of another embodiment wherein in this embodiment there is a clip such as clip 131 which is configured to allow the device 10c to be coupled to another object to be monitored.

Figure 5D:
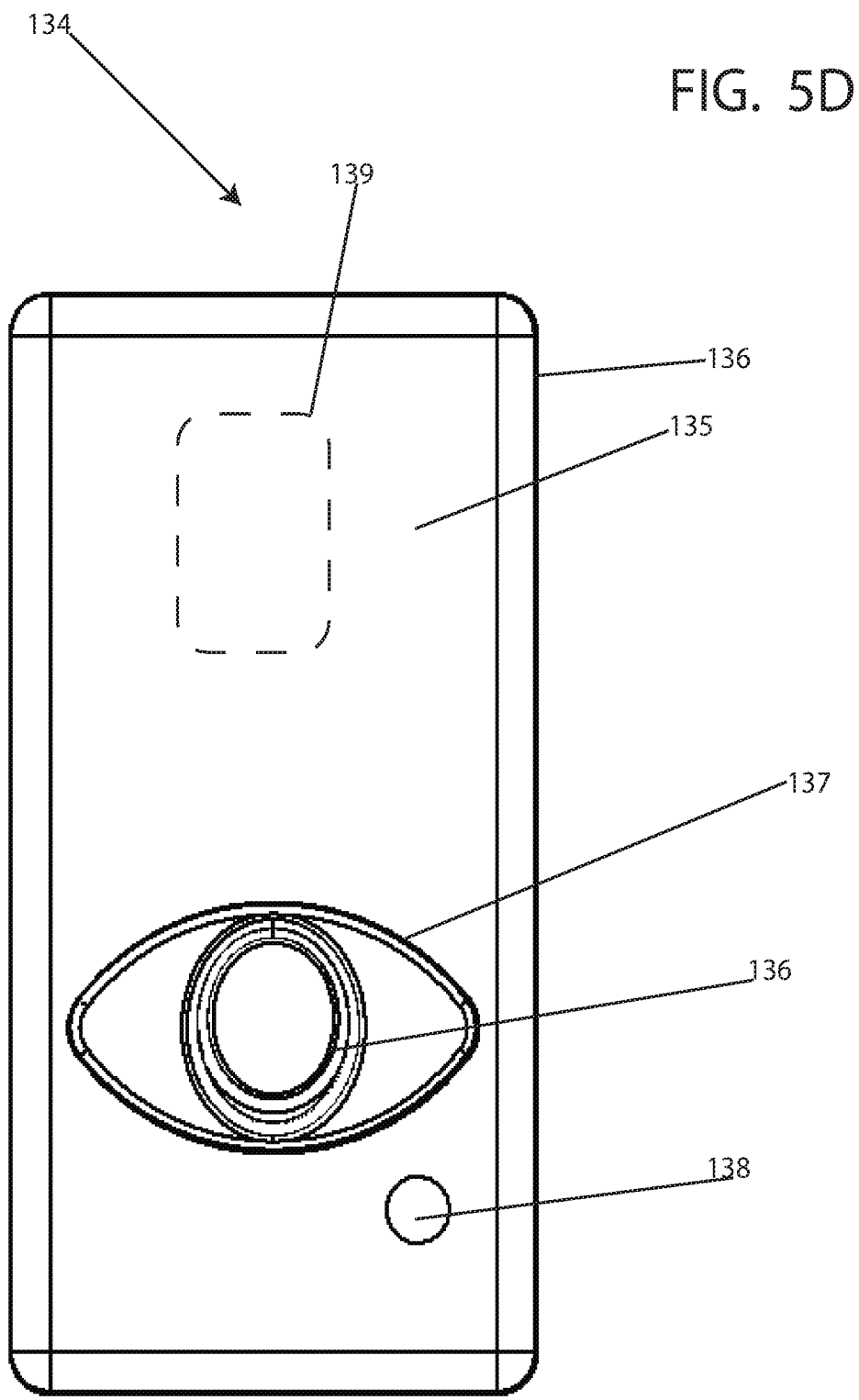
FIG. 5D is another view of another embodiment.

FIG. 5D is another view of another embodiment 134, which includes a housing 135 which is comprised of two halves secured to each other by ultrasonically welding, applying adhesives to seams 136, or via snap fits. The device can include a multicolor indicator light 138 as well as a reset button 137 which can be shaped in the form of an eye and coupled to housing 135 which includes button reset circuitry 101 as well. In addition, coupled to a back side is a fastener 139 which can be in the form of any suitable fastener outlined above, including but not limited to the fasteners outlined in FIGS. 5A-5C. Inside of this housing 135 are the electronic components outlined in FIG. 1 and/or outlined in FIG. 6.

FIG. 6 is a schematic block diagram of the electrical components associated with the device. FIGS. 6A-6I are close up views of these components. For example, there is a motherboard 115 having a reset button 101, a programming interface 120, a fiducials and markings device 121, a low battery alert circuit 122, a microcontroller 123 which can comprise an onboard memory and WIFI transceiver, and a multicolor LED. There is also a micro USB battery charging circuit, along with a voltage regulation circuit, as well as a temperature sensor 127.

In addition, optional components can be coupled to the motherboard such as a battery 116, a memory chip or memory card 128, and a separate transceiver 129. With these additional components, the microcontroller 123 would not need to have an onboard memory, or an onboard transceiver as well. Furthermore, with a separate battery such as battery 116, this would allow a separate battery to be removed and selectively replaced. In at least one embodiment battery 116 comprises a rechargeable battery which is in communication with USB port 125 which is configured to selectively charge the battery.

To utilize communication device at its ultimate capacity for accuracy and prevention, it is essential that setup time is spent with the app or other device with pairing to the specific device 100. For example, an apparatus is purchased and paired with the application run by a smart phone. The application will ask the user what they are monitoring with the apparatus which is important to enter correctly since the monitoring and event zoning is specific to the item of concern. For example, a candle is selected. A candle can be lit for an extended period without being considered high risk or in a danger zone. If a Christmas tree were selected for monitoring, then the tolerance for increased temperature is little to none since Christmas trees are known to burn up quite rapidly and there is no "blowing out" as you would in a candle or an off switch as there would be to a stove or other appliances. The identifiable characteristic will communicate between the application and the item for monitoring and tolerance levels. A stove can also be kept on for an extended amount of time without high danger zone risk (depending on the salvage value of the remaining life of the stove of course). The user will also be prompted to set up a recommended amount of emergency contacts and a GPS in the device will be linked to pair the closest fire department. There are other questions, tips, and recommendations that are suggested to the user. The more time spent in the set up to enter in the specific information about the item of concern, the more accurate and reliable the results will be.

Events regarding monitoring of temperature are analyzed in "zones." Green zone is neutral and no risk. Yellow zone is moderate-low risk. Red zone is high risk and considered dangerous. In the green zone, event notifications are executed to create awareness that product is in use. In the yellow zone, you will be notified as such and communication between the apparatus and the device may be done more frequently or other measures may be taken to monitor properly. In the danger zone you will have a designated amount of time based on the item being monitored to respond to the event. If you choose to dismiss the notification/event it will notify the user constantly. A user can override and choose to completely ignore or if no action is taken within a designated amount of time, a separate event notification will be sent to the first emergency contact. If the first emergency contact does not respond within designated amount of time, then the event notification will proceed to the next emergency contact and so on until a response and direction is received. If there are no responses by the emergency contacts or a response but no change to the level of the danger zone, communication will be sent to the closest fire department.

There is a Bluetooth module in the device 100. Also, there is the option of GPS which may be integrated. The Bluetooth module can notify the user when out of range and which devices are left "on" with or without communicating with a base station. Alternatively, the system can detect when a remote smartphone is outside of an initial WIFI range. This creates a geofencing perimeter which then can be used to indicate to the user that they are outside of the geofencing range while a particular appliance is on. Thus, the user will know if they have left the residence with a monitored item still in operation. This will eliminate having to turn around have leaving your residence and will notify the user when they walk out the door to eliminate worry and uncertainty.

The apparatus may have various options of battery life. Disposable batteries with a predetermined life time, rechargeable batteries, and extended life are just a few of the options. The device 100 may be applied to item selected by various fasteners. Some examples of possible fasteners are adhesives, magnetics, fires safe material, and more. The device and fastener is durable enough to encounter the temperature increases being monitored.

Ultimately at least one embodiment of the invention is an apparatus for temperature monitoring made up of sensors, logic and communication components which will essentially most frequently be paired with a WIFI router, a communication center or directly with a smart phone. The apparatus is made up of identifiable characteristics which are strongly utilized in the monitoring process using specific criteria for individual item. Events or notifications will be sent to user's smart device of choice based off of zones for in use, moderate risk or concern, and danger zone. If the user does not react to danger zone notifications, the communication will search for next in line which is a recommended list of emergency contacts and lastly the nearest fire department in the radius. Alternatively, the system can call a central call center before calling a fire department so that the central call center can troubleshoot the status of the sensor as well as an associated appliance or device being detected.

At least one embodiment of the invention is configured to prevent and promote fire protection and awareness and to save lives that are drastically lost due to these dangerous events. Thus, the system is configured to prevent fires before there is any need for smoke or fire alarms.

Figure 7:
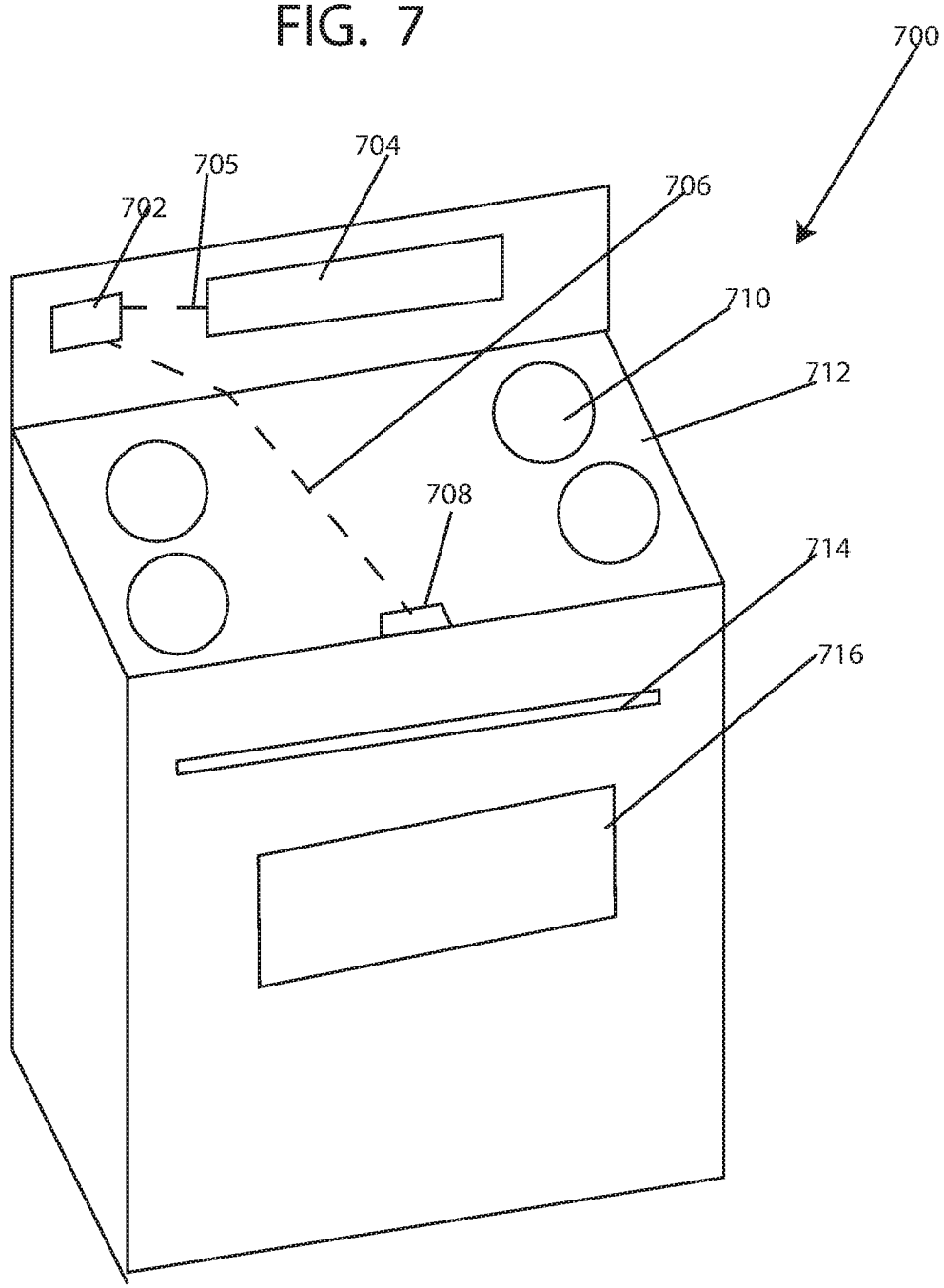
FIG. 7 is a view of the device incorporated into a stove.

FIG. 7 shows another version of an embedded device which can be implanted on an appliance such as stove/oven combination. For example, the heat and temperature monitoring device 702 can be coupled to a stove adjacent to its control panel such as control panel or display 704. A communication line 706 can be run from device 702 to a remote sensor such as sensor 708. The remote sensor can be placed adjacent to a stovetop 712 or adjacent to a handle 714 on an oven. The oven can also have an open glass viewing area as well. The device 702 can have multiple remote sensors such as one sensor for each burner as well as the oven or one sensor placed on the oven or stove in a location convenient to read the temperature of the burners and oven simultaneously. In addition, while a communication line 706 is shown the heat and temperature monitoring device can be alternatively in wireless communication with the sensor 708. The remote monitoring device 702 can be coupled to the stove's electrical system so that it is directly powered by the stove's electrical system via for example power line 705 coupled between the remote monitoring device 702 and the display 704 on the stove.

Figure 8:
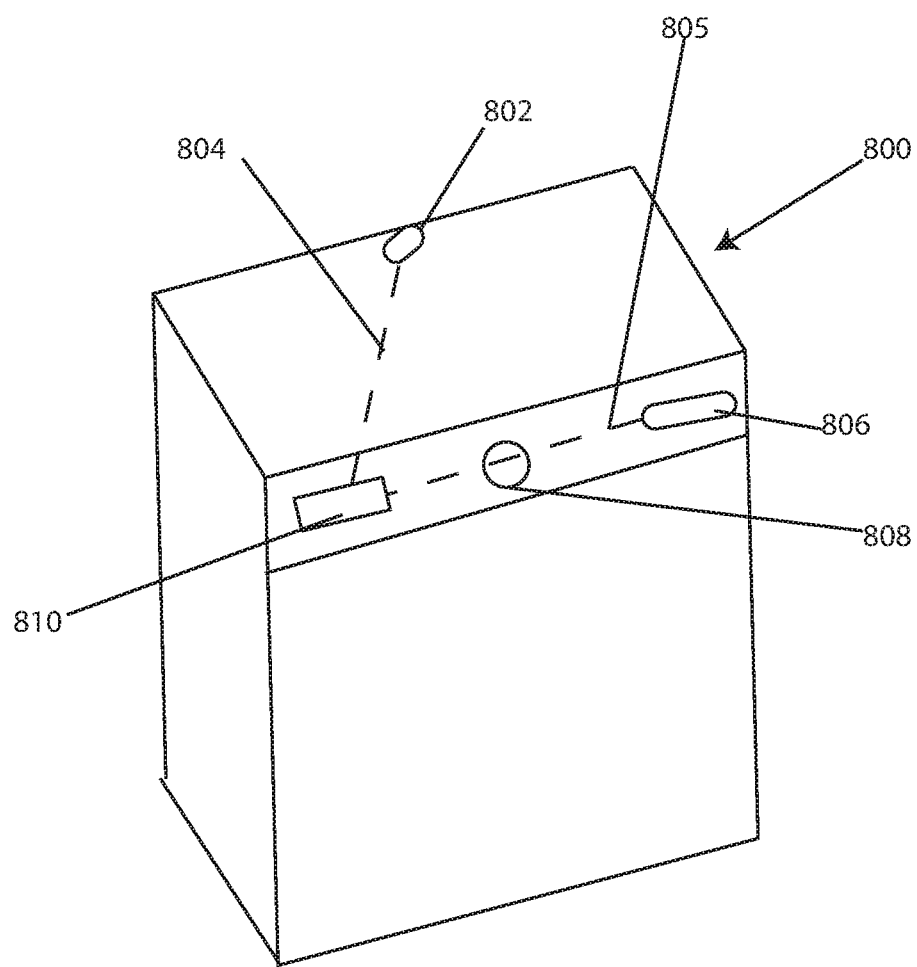
FIG. 8 is a view of the device incorporated into a dryer.

FIG. 8 shows another version of the device wherein the heat and temperature monitoring device 810 is combined with a dryer appliance 800. The heat and temperature monitoring device 810 can be coupled to a remote sensor 802 via a communication line 804 coupled at one end to the device 810 and at another end to the sensor 802. The sensor can be located on the dryer adjacent to the dryer drum or positioned adjacent to the exhaust port of the dryer. Dryer 800 includes dials 808 and an indicator 806 as well. The monitoring device 810 can be coupled to the electrical system of the dryer so that it is powered by the dryer's electrical lines as well such as via line 805. In addition, the monitoring device 810 can also be in communication with the remote sensor 802 in a wireless manner.

Figure 9:
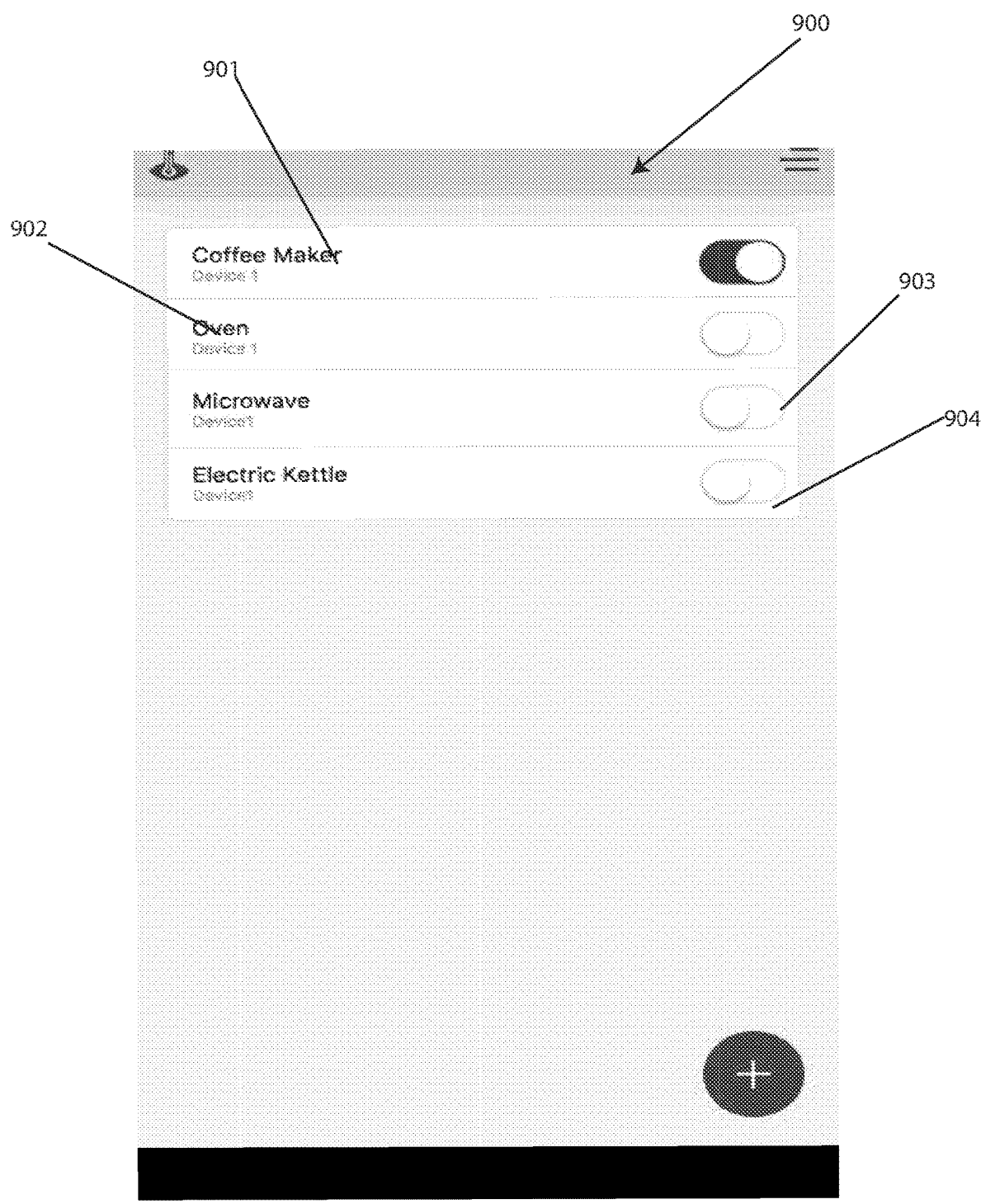
FIG. 9 is a view of a first screen shot.

FIG. 9 shows a screen shot of a selection screen wherein the user can select a particular appliance. For example, a user can select on screen 900 a coffee maker 901, an oven 902, a microwave 903, and an electric kettle 904 for example. Other appliances can be selected such as a dryer shown in FIG. 8 or any other object to be tracked such as a candle discussed above, or a Christmas tree as discussed above as well.

Figure 10:
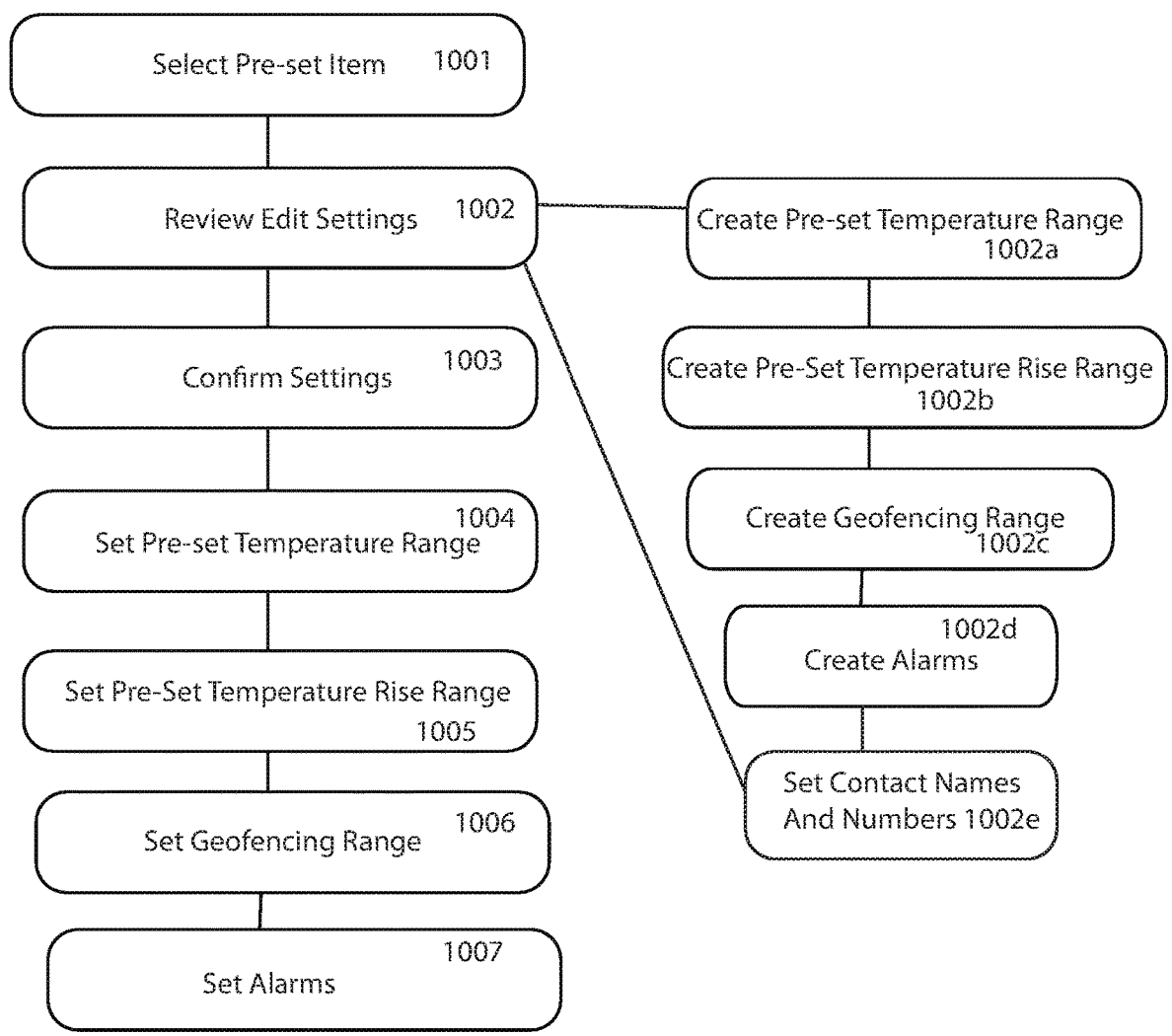
FIG. 10 is a view of a flow chart for registering a device and for setting parameters.

FIG. 10 shows the flow chart for the process for selecting an appliance and then for setting the pre-set configuration of the appliance. For example, the process starts in step 1001 wherein a user can select a pre-set item such as an appliance such as shown in FIG. 9. Next, in step 1002, the user can review the settings set for the appliance. If the user does not agree with the settings, the user can re-set the settings. For example, the user can change or create a pre-set temperature range in step 1002*a*. Next, in step 1002*b* the user can create a pre-set temperature rise range. This temperature rise range tracks the acceleration in temperature (change in temperature vs. time). Next, in step 1002*c*, the user can set the geofencing range. This geofencing range can be set by a radius formed around the tracked device or as a pre-set distance the user is from a pre-set coordinate such as a center region of a house or home. Next, the user in step 1002*d* can set or create particular types of alarms to use such that when the user is notified that there is a rapid temperature rise they might be notified simply by their cell phone, or it may directly call a call center, or it may directly call a first responder such as a fire department, or it may simply set forth a beep or small indicator if the type of alarm is not all that urgent. In step 1002*e* the user can set the names and numbers of the emergency contact information.

Alternatively, the confirmation of these settings in step 1003 involves the confirmation of the pre-set temperature range 1004, a confirmation of the pre-set temperature rise range 1005, a confirmation of the geofencing range 1006. Finally, the user can set his/her alarms 1007.

Figure 11:
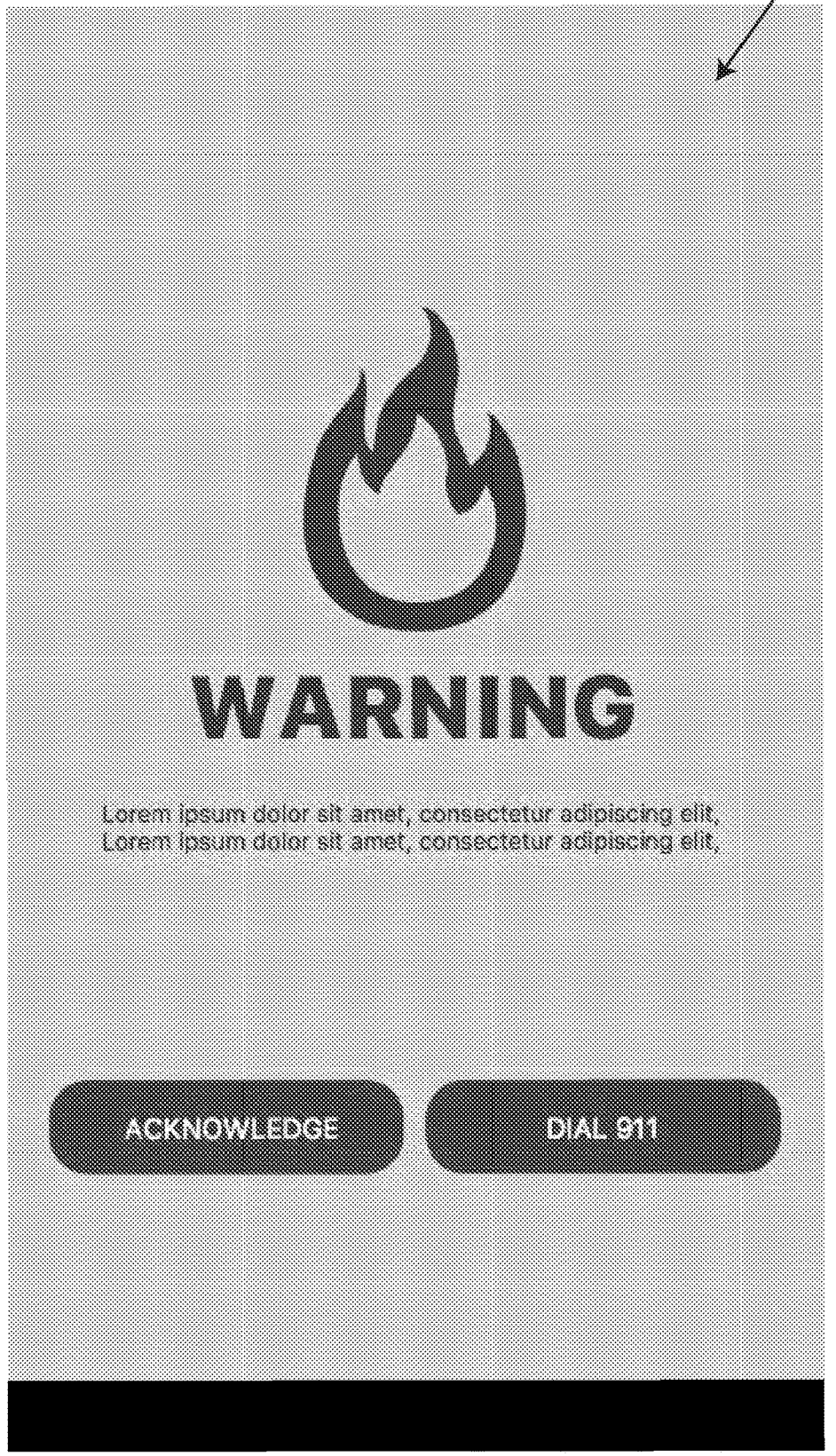
FIG. 11 is a view of a screen shot of a warning screen.

FIG. 11 shows a warning screen 1100 which indicates a first type of alarm that can be issued to a user.

Figure 12:
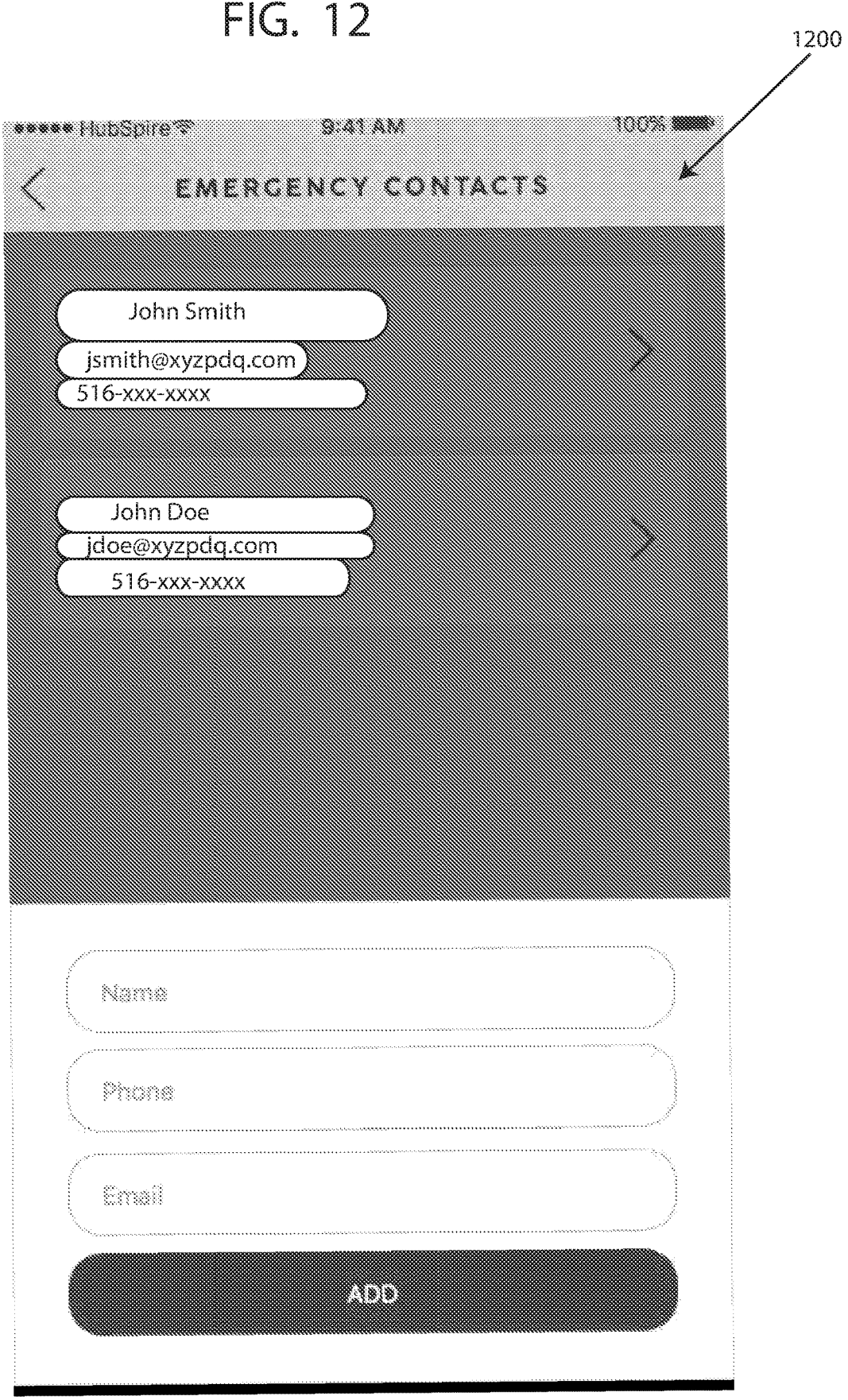
FIG. 12 is a view of a screen shot of a listing of emergency contacts.

FIG. 12 shows another screen 1200 which can be presented in the event of an alarm as well. This screen can allow a user to contact pre-set emergency contacts as well. All of these types of screens as well as the names and numbers of the contacts can be set in step 10023 or pre-set for the user when the user selects an appliance in step 1001.

Accordingly, while at least one embodiment of the present invention have been shown and described, it is to be understood that many changes and modifications may be made thereunto without departing from the spirit and scope of the invention as defined in the appended claims

What is claimed is:

1. A temperature and heat monitoring network comprising:
   a first temperature and heat monitoring device comprising:
   a portable housing;
   at least one microprocessor disposed in said housing;
   at least one sensor configured to determine an amount of heat adjacent to the device;
   at least one memory configured to store a predetermined set of values relating to temperature, and a set of predetermined values relating to a predetermined condition, as well as an identity of the device;
   at least one sensor plate in communication with said at least one sensor and disposed on the portable housing, said at least one sensor plate configured to read a temperature of an adjacent body;
   at least one power source in communication with said at least one microprocessor;
   at least one transmitter configured to communicate directly with an adjacent electronic device,
   a second temperature and heat monitoring device which is in wired communication with an appliance, the second temperature and heat monitoring device comprising:
   at least one microprocessor;
   at least one sensor configured to determine an amount of heat adjacent to the appliance;
   at least one memory configured to store a predetermined set of values relating to temperature, and a set of predetermined values relating to a predetermined condition, as well as an identity of the device;
   at least one sensor plate in communication with said at least one sensor, said at least one sensor plate configured to read a temperature of an adjacent body;
   at least one transmitter configured to communicate directly with an adjacent electronic device,
   wherein for each of said first temperature and heat monitoring device and said second temperature and heat monitoring device said at least one microprocessor is configured to read signals from said at least one sensor, and to read information from said memory and to determine whether any information from said sensor is outside of said predetermined set of values relating to heat and then to selectively send a signal to the adjacent electronic device to indicate a heat or temperature condition or a predetermined condition stored in said memory as well as an identity of the device;
   at least one wireless network;
   at least one portable electronic device associated with a user, wherein the at least one wireless network is configured to create a geofencing perimeter with each of the at least two temperature sensing devices wherein the perimeter is used-to determine whether the user is within a pre-set distance range of the at least two temperature and heat monitoring devices.

2. The temperature and heat monitoring network as in claim 1, wherein said first temperature and heat monitoring device further comprises at least one fastener which comprises at least one adhesive coupled to said housing.

3. The temperature and heat monitoring network as in claim 2, wherein said at least one fastener comprises at least one L-shaped clip.

4. The temperature and heat monitoring network as in claim 2, wherein said at least one fastener comprises a hook and loop fastener.

5. The temperature and heat monitoring network as in claim 1, wherein for at least one of said first temperature and heat monitoring device and said second temperature and heat monitoring device said at least one transmitter is a Bluetooth transmitter for direct communication with an adjacent electronic device.

6. The temperature and heat monitoring network as in claim 1, wherein for at least one of said first temperature and heat monitoring device and said second temperature and heat monitoring device said at least one transmitter is a WIFI transmitter wherein said first temperature and heat monitoring device and said second temperature and heat monitoring device form a geofencing perimeter, wherein the perimeter is used-to determine whether the user is within a pre-set distance range of the at least two temperature and heat monitoring devices.

7. The temperature and heat monitoring network as in claim 1, wherein for at least one of said first temperature and heat monitoring device and said second temperature and heat monitoring device said at least one transmitter is a cellular transmitter for direct communication with an electronic device.

8. The temperature and heat monitoring network as in claim 1, wherein for at least one of said first temperature and heat monitoring device and said second temperature and heat monitoring device there further comprises at least one LED indicator which is coupled to the housing and which is configured to change colors depending upon instruction from said microprocessor.

9. The temperature and heat monitoring network as in claim 1, wherein for said first temperature and heat monitoring device said at least one power source comprises at least one battery.

10. The temperature and heat monitoring network as in claim 1, wherein for said first temperature and heat monitoring device said at least one power source comprises at least one USB port.

11. The temperature and heat monitoring network as in claim 1, wherein for at least one of said first temperature and heat monitoring device and said second temperature and heat monitoring device there further comprises at least one reset button.

12. The temperature and heat monitoring network as in claim 1, wherein for at least one of said first temperature and heat monitoring device and said second temperature and heat monitoring device there further comprises at least one programming interface in communication with said at least one memory, wherein said programming interface is configured to input information into said at least one memory.

13. The temperature and heat monitoring network as in claim 1, wherein for at least one of said first temperature and heat monitoring device and said second temperature and heat monitoring device there further comprises at least one low battery alert configured to alert a user of a condition wherein the device has a low battery.

14. The temperature and heat monitoring network as in claim 13, wherein said low battery alert comprises at least one of a light, a sound indicator or a transmitter.

15. The temperature and heat monitoring network as in claim 1, wherein for at least one of said first temperature and heat monitoring device and said second temperature and heat monitoring device said transmitter is a RF based transmitter.

16. The temperature and heat monitoring network as in claim 1, wherein for said first temperature and heat monitoring device there further comprises at least one motion detector in communication with said at least one microprocessor.

17. The temperature and heat monitoring network as in claim 1, wherein for said first temperature and heat monitoring device there further comprises at least one accelerometer in communication with said at least one microprocessor.

18. The temperature and heat monitoring network as in claim 1, wherein for at least one of said first temperature and heat monitoring device and said second temperature and heat monitoring device there further comprises at least one solar cell configured to provide power to the device.

19. A temperature and heat monitoring system comprising:
   at least two temperature and heat monitoring devices each comprising:
      a portable housing;
      at least one microprocessor disposed in said housing;
      at least one sensor configured to determine an amount of heat adjacent to the device;
      at least one memory configured to store a predetermined set of values relating to temperature;
      at least one fastener configured to couple the portable housing to an adjacent object;
      at least one sensor plate in communication with said at least one sensor and disposed on the portable housing adjacent to said at least one fastener, said at least one sensor plate configured to read a temperature of an adjacent body;
      at least one power source in communication with said at least one microprocessor; and
      at least one transmitter configured to communicate directly with an adjacent electronic device, wherein said at least one microprocessor is configured to read signals from said at least one sensor, and to determine whether any information from said sensor is outside of said predetermined set of values relating to heat and then to selectively send a signal to the adjacent electronic device to indicate a heat or temperature condition;
   at least one wireless network;
   at least one portable electronic device associated with a user, wherein the at least one wireless network is configured to create a geofencing perimeter with each of the at least two temperature sensing devices wherein the perimeter is used to determine whether the user is within a pre-set distance range of the at least two temperature and heat monitoring devices.

20. The temperature and heat monitoring system as in claim 1, wherein the appliance is a stove and wherein said second temperature and heat monitoring device is wired to said stove's electrical system.

21. The temperature and heat monitoring system as in claim 1, wherein said second temperature and heat monitoring device is coupled to a stove adjacent to its control panel, wherein the sensor is configured to be placed on a stovetop.

22. The temperature and heat monitoring network as in claim 1, wherein said first temperature and heat monitoring device is configured to be attached to at least one of a candle, a tree, a hair straightener, a curling iron, a stove, a light fixture, a fireplace, an iron, a steamer, an electric heater, a coffee pot, a tea kettle and a BBQ.

23. The temperature and heat monitoring network as in claim 1, wherein the predetermined values stored in at least one of said first temperature and heat monitoring device and said second temperature and heat monitoring device are particularized based upon the device that each sensor is monitoring.

* * * * *